United States Patent
Guillama et al.

(10) Patent No.: US 10,679,185 B2
(45) Date of Patent: Jun. 9, 2020

(54) PERSONAL ATTRIBUTE CARTOGRAPHY WITH ANALYSIS FEEDBACK

(71) Applicant: Synabee, Inc., Wellington, FL (US)

(72) Inventors: Noel J. Guillama, Wellington, FL (US); Chester A. Heath, Boca Raton, FL (US)

(73) Assignees: SynaBEE, Inc., Wellington, FL (US); Noel J. Guillama, Wellington, FL (US)

( * ) Notice: Subject to any disclaimer, the term of this patent is extended or adjusted under 35 U.S.C. 154(b) by 425 days.

(21) Appl. No.: 14/467,539

(22) Filed: Aug. 25, 2014

(65) Prior Publication Data

US 2015/0058341 A1    Feb. 26, 2015

Related U.S. Application Data

(60) Provisional application No. 61/869,097, filed on Aug. 23, 2013.

(51) Int. Cl.
*G06Q 10/10* (2012.01)
*G06Q 10/06* (2012.01)

(52) U.S. Cl.
CPC ..... *G06Q 10/105* (2013.01); *G06Q 10/06398* (2013.01)

(58) Field of Classification Search
CPC ......... G06F 17/30864; G06F 17/30867; G06F 17/30011; G06Q 30/02; G06Q 10/105; G06Q 10/06398
See application file for complete search history.

(56) References Cited

U.S. PATENT DOCUMENTS

| | | | |
|---|---|---|---|
| 6,654,725 B1 * | 11/2003 | Langheinrich | G06Q 30/02 705/14.52 |
| 7,647,561 B2 * | 1/2010 | Zondervan | G06F 9/45512 715/704 |
| 8,723,820 B1 * | 5/2014 | Han | G06F 3/016 178/18.01 |
| 9,378,516 B2 * | 6/2016 | Aldrey | G06Q 30/0269 |
| 2005/0091269 A1 * | 4/2005 | Gerber | G06F 9/44505 |
| 2005/0197787 A1 * | 9/2005 | Diedrich | G06N 3/126 702/20 |

(Continued)

FOREIGN PATENT DOCUMENTS

| WO | 2013/029032 A1 | 2/2013 |
|---|---|---|
| WO | 2013029032 | 2/2013 |

*Primary Examiner* — Pierre M Vital
*Assistant Examiner* — Andalib F Lodhi
(74) *Attorney, Agent, or Firm* — Nixon Peabody LLP

(57) ABSTRACT

Systems and methods for managing individuals are provided. A method includes recording interactions of a user with one or more computer-implemented applications and calculating parameter values for the user for a plurality of user attributes based on the interactions. The method can further include determining whether at least a portion of the parameter values are missing or conflicting and in response to determining wherein at least a portion of the parameter values are missing or conflicting, prompting the user to interact with at least one additional computer-implemented application that is associated with the portion of the parameter values. After the prompting, the method can include repeating the recording and the calculating to update the parameter values.

20 Claims, 13 Drawing Sheets

(56) References Cited

U.S. PATENT DOCUMENTS

| | | | |
|---|---|---|---|
| 2008/0120400 A1* | 5/2008 | Keller | G06Q 10/06 |
| | | | 709/223 |
| 2008/0222635 A1* | 9/2008 | Tommasi | G06Q 10/06 |
| | | | 718/100 |
| 2009/0119254 A1* | 5/2009 | Cross | G06F 17/30867 |
| 2009/0210246 A1* | 8/2009 | Patel | G06Q 30/02 |
| | | | 705/319 |
| 2010/0331146 A1* | 12/2010 | Kil | G06F 19/3481 |
| | | | 482/8 |
| 2011/0184247 A1* | 7/2011 | Contant | G06Q 10/10 |
| | | | 600/300 |
| 2013/0080438 A1* | 3/2013 | Tompkins | G06Q 30/0282 |
| | | | 707/740 |
| 2014/0250043 A1* | 9/2014 | Malinsky | G06N 5/02 |
| | | | 706/46 |
| 2014/0270388 A1* | 9/2014 | Lucey | G06T 7/2033 |
| | | | 382/107 |

* cited by examiner

600

| PACDNA | 3 | 2 | 6 | -2 | 7 | 3 | 9 | 1 | 0 | 2 | 5 | 4 | -1 | 6 | -1 | 4 | -1 | 5 | 1 |

FIG. 9

PERSONAL ATTRIBUTE CARTOGRAPHY WITH ANALYSIS FEEDBACK

CROSS-REFERENCE TO RELATED APPLICATIONS

This application claims priority to and the benefit of U.S. Provisional Application No. 61/869,097, filed Aug. 23, 2013 and entitled "PERSONAL ATTRIBUTE CARTOGRAPHY WITH ANALYSIS FEEDBACK", the content of which is herein incorporated by reference in its entirety.

FIELD OF THE PRESENT TECHNOLOGY

The present technology relates to analysis of personal attributes of individuals, and more specifically to apparatus and methods for analyzing personal attributes of individuals and generating meaningful feedback for such individuals.

BACKGROUND

Increasingly, society is organizing individuals into systems. We become identified by our occupation, interests, activities, accomplishments, associations and even our health/wellness. Individuals are evaluated planned, directed, and modified, as one might with various components in some complex machine or economy. This is not some Orwellian conspiracy, rather the natural outcome of individuals in an organized interactive economy, where individual and organizational diversity both contribute and benefit from a complex society.

BRIEF DESCRIPTION OF THE DRAWINGS

FIG. 9 shows an exemplary configuration for a PACDNA in accordance with the present technology;

Figure 1:
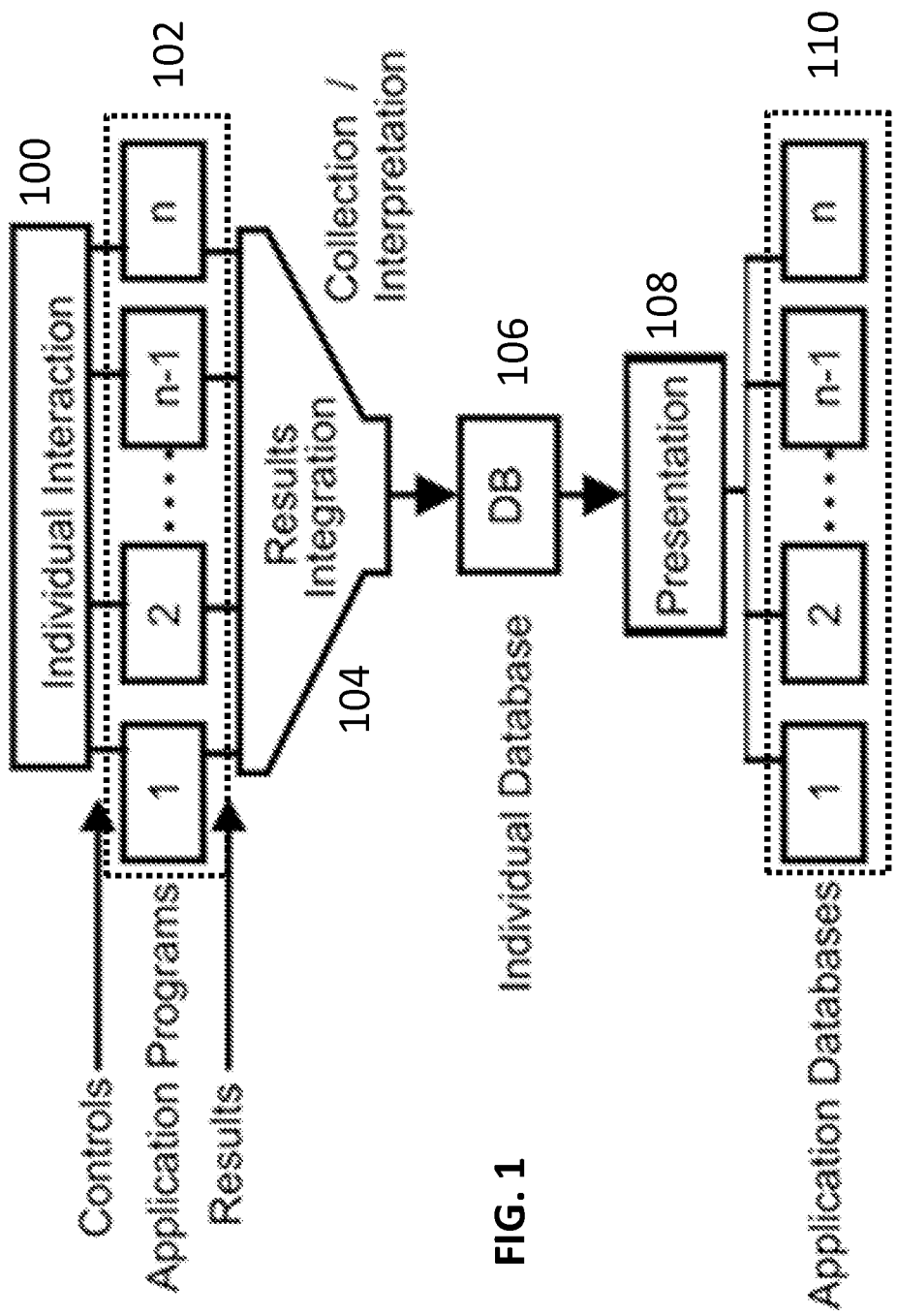
FIG. 1 shows an exemplary configuration for determining personal attributes in accordance with the present technology.

Some of the figures illustrate diagrams of the functional blocks of various embodiments. The functional blocks are not necessarily indicative of the division between hardware circuitry. Thus, for example, one or more of the functional blocks (e.g., processors or memories) may be implemented in a single piece of hardware (e.g., a general purpose signal processor or a block or random access memory, hard disk or the like). Similarly, the programs may be standalone programs, may be incorporated as subroutines in an operating system, may be functions in an installed imagining software package, and the like.

It should be understood that the various embodiments are not limited to the arrangements and instrumentality shown in the drawings.

DETAILED DESCRIPTION

The present technology is described with reference to the attached figures, wherein like reference numerals are used throughout the figures to designate similar or equivalent elements. The figures are not drawn to scale and they are provided merely to illustrate the instant present technology. Several aspects of the present technology are described below with reference to example applications for illustration. It should be understood that numerous specific details, relationships, and methods are set forth to provide a full understanding of the present technology. One having ordinary skill in the relevant art, however, will readily recognize that the present technology can be practiced without one or more of the specific details or with other methods. In other instances, well-known structures or operations are not shown in detail to avoid obscuring the present technology. The present technology is not limited by the illustrated ordering of acts or events, as some acts may occur in different orders and/or concurrently with other acts or events. Furthermore, not all illustrated acts or events are required to implement a methodology in accordance with the present technology.

The present disclosure contemplates that one consequence of organizing individuals into groups is that every action that we take impacts our peers, ourselves and the organization of the systems around us. If an observer were omnipotent, or merely patient and thorough, those interactions are discernible attributes that essentially define our attitudes, aptitudes, preferences, values and personality. The present technology is directed to systems, methods, and computer products for identifying those key attributes, which can then be invaluable when motivating the behavior of individuals.

The present technology provides a mechanism reduces this identification process to logical-mathematical analysis, where the process can be automated and used to dynamic modeling. There is a consequent uniformity to the accumulation of information and in the evaluation of the motivations of individuals that can be improved if the means is heuristic. This information is of prime interest to managers, marketers, therapists, governments, organizations and even healthcare professionals. When integrated with the concepts of Episodic Social Networks described in WO/2013/029032, this information is key to inducing the desired decisions and path through such networks. A system in accordance with the present technology could be modeled as shown in FIG. 1, where an individual provides interactions (100) with multiple applications (102). The results of these interactions can be provided to a collection/interpretation subsystem (104) to integrate the results and produce attributes for an individual that can be stored in database entries for the individual (106). These attributes can then be provided to a current application (108) and used to adjust a current presentation. In some embodiments, these attributes, alone or in combination with the results at the application (108) can be further used to generate measures of aptitude in one or more areas. In particular, the results from the application can be processed at one or more aptitude engines or databases (110) and each of these engines or databases can then provide a measure of aptitude in one area for of the individual.

In reality, an individual interacts with multiple activities, much as they might multiple independent applications in a multi-tasking environment. If one were to glean or "mine" attributes of the activities and collect, interpret and organize them along basic attributes, one could integrate the results of multiple activities to begin to define an individual. The attributes could be stored as associated parameters in a database and presented in terms of the information about the individual that is inherently dissolved in our activities.

For example, anyone who has raised a teenager can see how they can build a very complex virtual world around a gaming environment. For the time that they are immersed in the environment, it is complete. Indeed, many gamers (many older than teenagers) can manage multiple game environments simultaneously and almost all can handle such complexity in a serial one-game-at-a-time fashion. Role-Playing, Combat, Simulation and Strategy and many other games all utilize distinct portions of a gamer's aptitudes. One might integrate the results of each game environment, as controls or response to stimulus and see attributes or components of Responsiveness, Reasoning, Creativity, and Aggression in each application. Indeed, one might also impute measurements of compliance, morality, sensitivity, romance . . . and the list goes on indefinitely. In the simplistic world of the game, our identity may be revealed, even as we perceive it to be concealed.

These attributes are buried in the response of the individual, often rapid response, where there is little time to "out-think" the analysis and mislead the interpretation. The right algorithm, for each application can build a database that could profile, categorize and perhaps rank gamers by their attributes. If this concept were carried no further, one could create a fine tool for the psychological measurement of an individual simply from their stimulus-response in a myriad of game environments. Games may be perhaps defined to elicit and exhibit the attributes and aptitudes we wish to evaluate. This is illustrated in FIG. 2.

Figure 2:
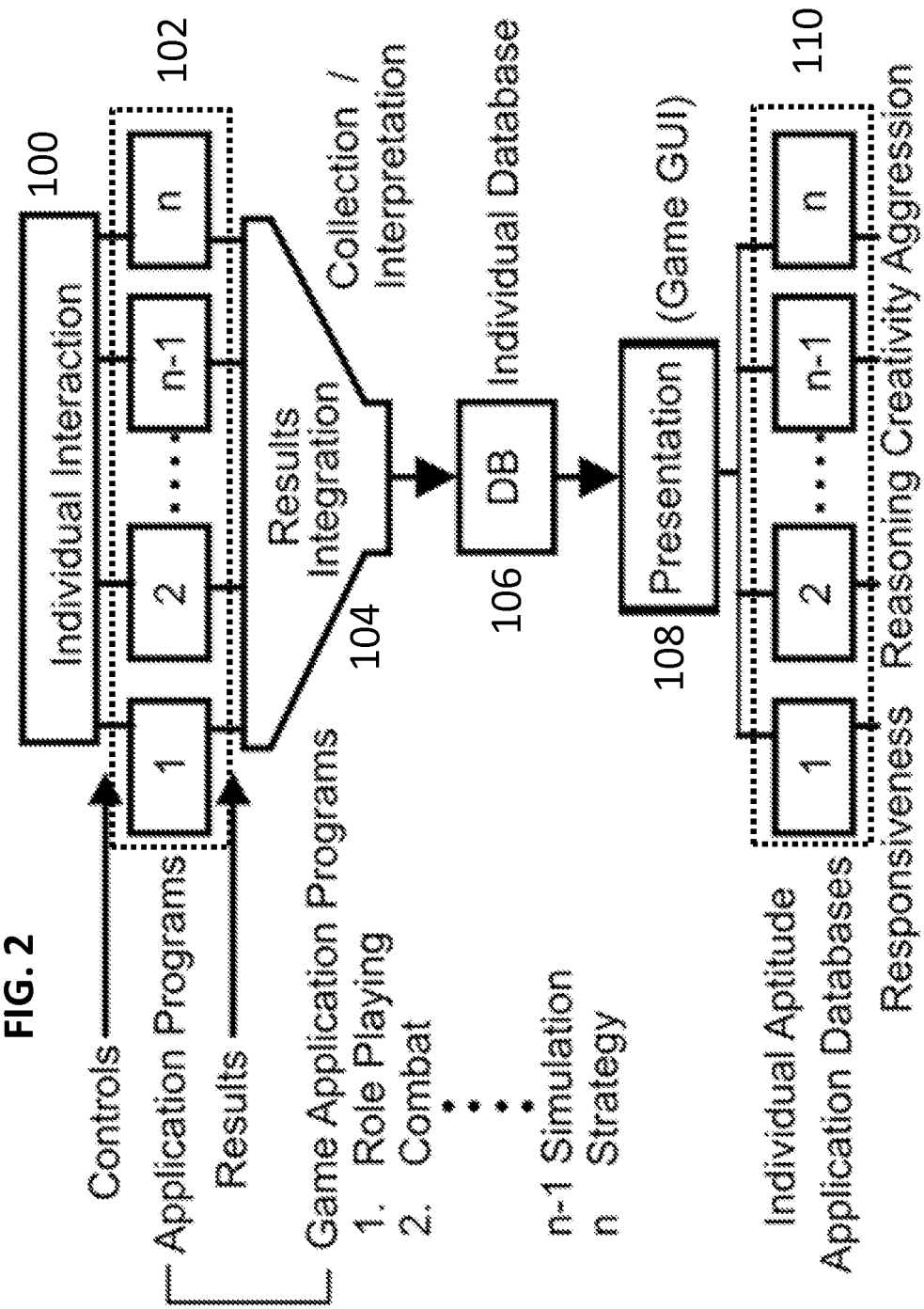
FIG. 2 shows the configuration of FIG. 1 adapted for a gaming domain or environment.

FIG. 2 presents the model of FIG. 1, adjusted for evaluating individual attributes of individual playing games. In FIG. 2, the interactions (100) can be those with application (102) in the gaming world. That is, different types of games, as shown in FIG. 2. After the integration and generating of attributes (104, 106), the attributes can be provided at the individual's current game and can be used for informative purposes or to adjust gameplay. Thereafter, the results from the gameplay can be utilized to obtain measures of aptitude important to gameplay, such as responsiveness, reasoning, creativity, and aggression, as shown in FIG. 2.

Figure 3:
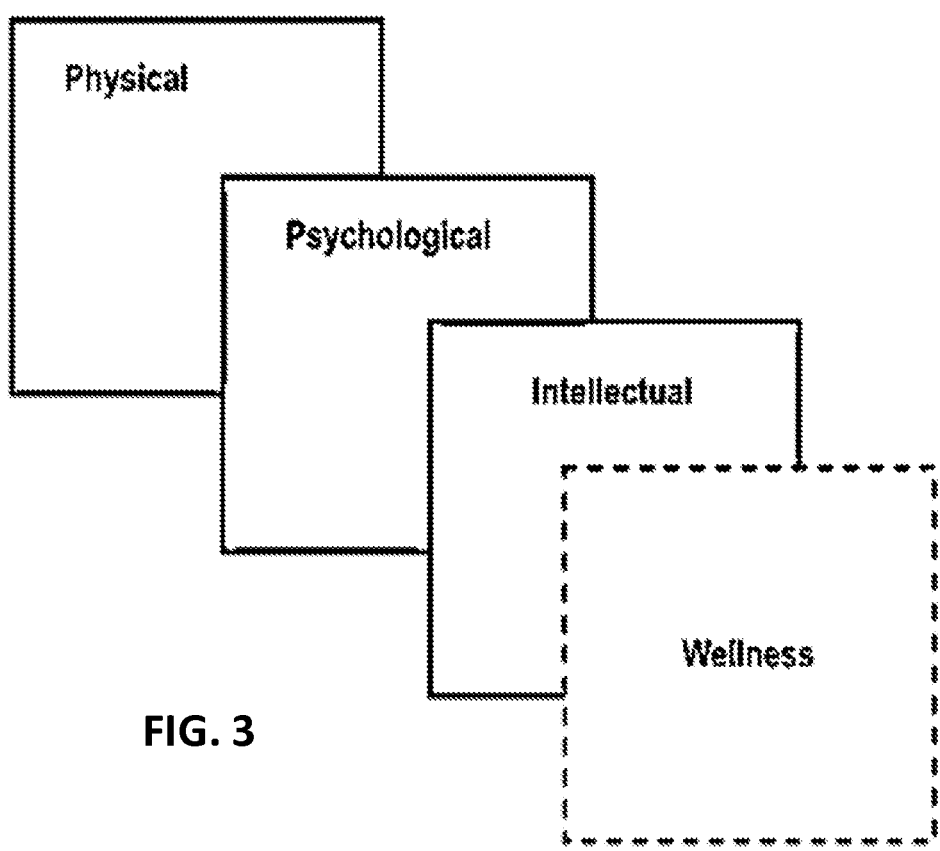
FIG. 3 illustrates schematically potential layers or spaces according to the present technology.

However, individuals and our complex social environment are far more intricate in the real world than games. We live in multiple planes, as illustrated in FIG. 3, indeed multi-dimensional spaces that overlap and defy the ability of lines on paper to describe. Our physical responsiveness may be exhibited in the "muscle memory" of all the activities we learn from birth: walking, athletics, dancing, speaking—and these are all interactive with the psychological environment we develop within—with all our multifaceted emotional responses.

This couples with our intellectual background that defines our knowledge, opinions, and attitudes that make up our skills There as many of these domains as our imaginations can create and then some. Some would see spiritual domains, where others may not. Some may see moral, ethical or social boundaries that evade the perceptions of others. Indeed there are also maps that define legality, politics, and rational thought as a philosopher might define.

Figure 4:
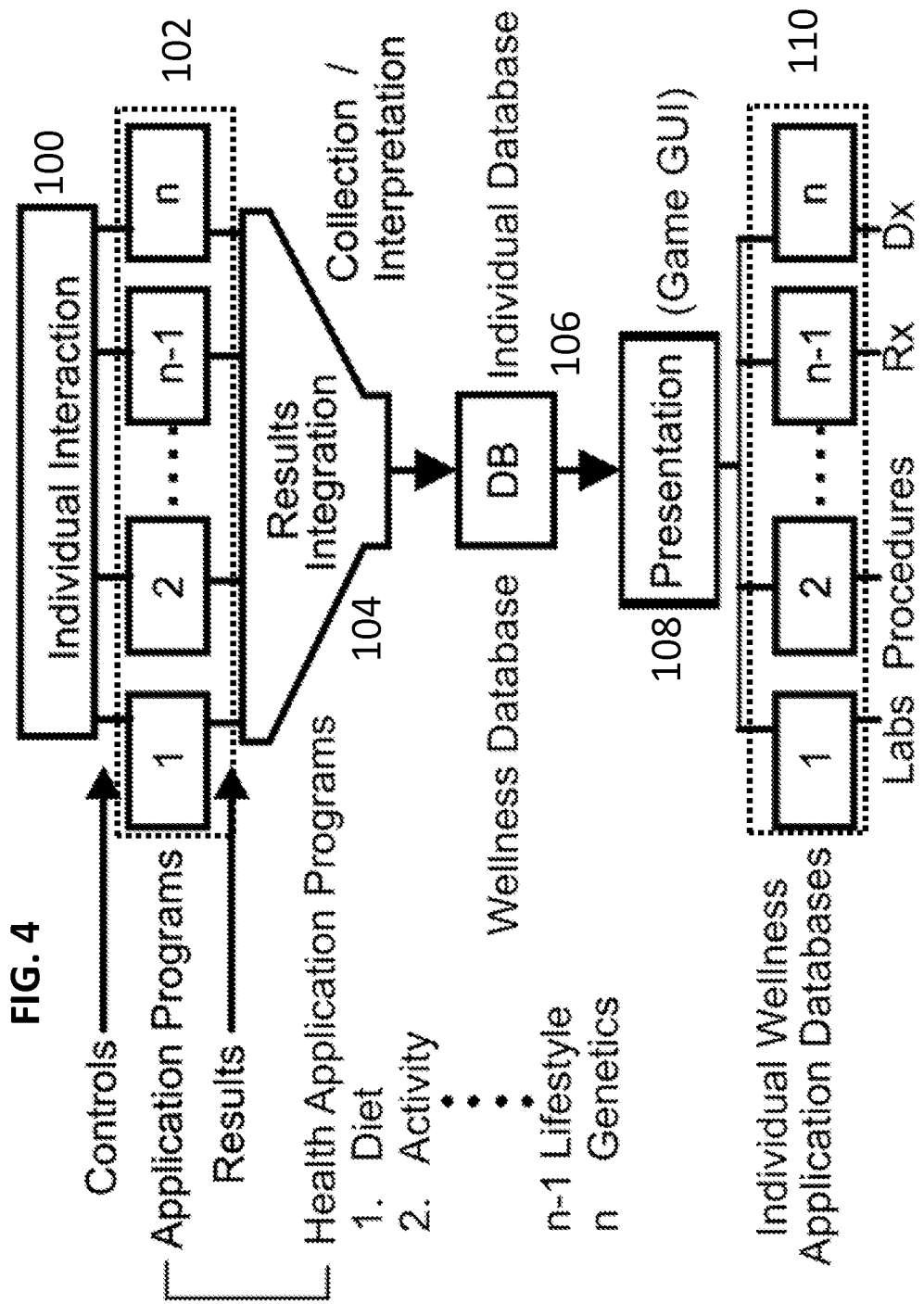
FIG. 4 shows the configuration of FIG. 1 adapted for a healthcare domain or environment.

For example, as shown in FIG. 3, physical, psychological, and intellectual spaces all intersect and culminate in another space: Wellness. Wellness is the domain of the caregiver and central focus of their knowledge, skills and application. Indeed, a map may also be created around the patient and all the caregivers that they encounter. A patient centric healthcare system, could be described in terms of a Wellness map where the applications are Electronic Health Records HER], Personal Health Records [PHR and the like. This is illustrated with respect to FIG. 4, showing the model of FIG. 1 in a healthcare context. The GUI could be similar to the game interface or custom to the healthcare application In healthcare, an individual may be enrolled in numerous wellness activities (application programs), care plans, therapies that respond to each domain, much as the gamer responds with multiple parameters in their domain. In the healthcare and wellness domain organ systems respond to tests, tissue can be typed, disease defined around and centered on the individual. For example, these algorithms integrate the buildup of plaque on teeth and arteries (same process), or the response to sugar and exercise. Laboratory results can be seen as cause and effect and assembled from components of Diet, Activity, Lifestyle, Genetics—as well as attitude, and other less precise driving forces. Mined through the "results/integration funnel", an omnibus laboratory view of the individual, a 360 degree perspective, can be assembled to define care plans, therapies, prescriptions, diagnosis and procedures around the whole individual. As we will see in the following, those applications can be optimized for diagnosis.

One can also see that there is an interactivity between individuals where appropriate associations may be formed (or broken) to achieve specific goals for the society or economy. Again, not an Orwellian concept, but, with just the information from the gamer's map, some might decide to become soldiers, others to congregate with intellectually similar people, or to develop skills in specific talent areas.

Clearly, the information produced from wellness maps, psychological profiles, aptitude evaluations, ethical drives may be used to encourage or discourage assembly, or even migration of individuals. There are implications to social wellness, homeland security, national defense, career development as well.

Unfortunately, the information at this level is still open to subjective interpretation. For some individuals it is likely incomplete, even potentially contradictory, yet human intuition may still yield results. However, those results are unlikely to be consistent and comparable across a range of individuals. When there are millions of individuals to be analyzed and compared, the process must be uniform and accurate and cannot be time limited by the availability of a limited number of skilled "technicians".

In view of the foregoing, the present technology also provides for incorporating the models discussed above into an automated platform to automatically process aptitude, wellness information, or the like into feedback for the individual. In one embodiment, the platform provides a heuristic that produces an array of data that can be automatically mined for the desired personal attribute profiles of many individuals. In this proposed platform, the information is fed back to the means to collect the data through the integration of the results of controls and stimulus. The result is a complex signature of personality, skills, and other attributes.

Figure 5:
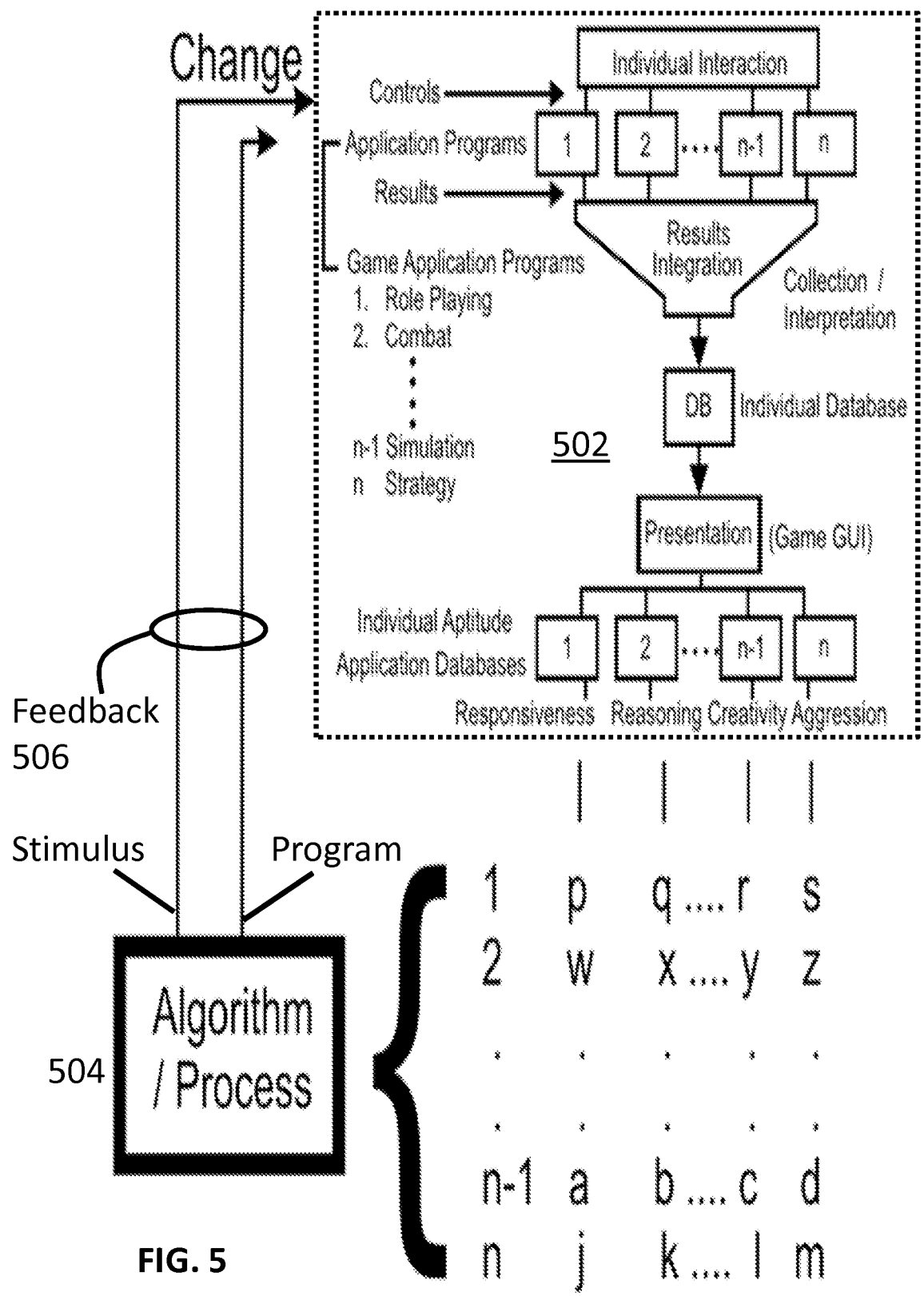
FIG. 5 shows the configuration of FIG. 1 with a feedback loop.

The feedback enables the selection of appropriate applications (e.g. games) to yield missing or conflicting attributes. It may even drive definition of new applications for the individual, to yield the desired number and type of attributes for a complete analysis of the individual. In one particular embodiment, the feedback data can be obtained via the reduction of the data to matrices, thereby yielding a number of simultaneous equations that relate the results that may be expected to specific sets of stimuli for a given individual. This is generally illustrated in FIG. 5, wherein the aptitude or wellness information of the model 502 of FIG. 1, 2, or 4 is processed via an analysis module or engine 504 to produce feedback 506 for the individual, in the form of stimulus or identification of other programs and applications, to induce a desired change or effect.

It is the automated analysis and adaptive feedback toward the selection, adaptation, adjustment and on-demand development of evocative applications that sets this means apart from the "Myers-Briggs" "open-loop" and subjective type of individual evaluation procedures that have been typical for perhaps a century. The specific intent is to reduce the dependence on human subjectivity and enable an automated, heuristic, and scalable process that can be made consistent across masses of individuals.

For example, (using games for clarity) relative parameters of aggression (x) and creativity (y) are discerned from playing two games. There are offsets that arise as figures of attractive merit to a given game: charges to use the game, time spent on a game, other credits surrendered or user's subjective evaluation figures yielding constants in the equations. A comparable standard unit of significance of each parameter is unknown, only the relative assessment from the specific games chosen:

$$2x-2y-3=0 \text{ and } 8y=7x+2$$

Then, writing the equations in the form $ax+by=c$, one obtains $$2x-2y-3=0 \text{ or } 2x-2y=3 \text{ and } 8y=7x+2=0 \text{ or } 7x-8y=-2$$

In matrix format this yields:

$$\begin{bmatrix} 2, -2 \\ 7, -8 \end{bmatrix} \begin{bmatrix} X \\ Y \end{bmatrix} = \begin{bmatrix} 3 \\ -2 \end{bmatrix}$$

Finding the inverse of the 2×2 matrix: Determinant=(2x-8)-(-2×7)=-2

$$\text{Inverse} = -\frac{1}{2}\begin{bmatrix} -8, 2 \\ -7, 2 \end{bmatrix} = \begin{bmatrix} 4, -1 \\ 3.5, -1 \end{bmatrix}$$

Reducing the matrix, both sides of the matrix equations are multiplied with the inverse $$\begin{bmatrix} 4, -1 \\ 3.5, -1 \end{bmatrix} \begin{bmatrix} 2, -2 \\ 7, -8 \end{bmatrix} \begin{bmatrix} X \\ Y \end{bmatrix} = \begin{bmatrix} 4, -1 \\ 3.5, -1 \end{bmatrix} \begin{bmatrix} 3 \\ -2 \end{bmatrix}$$

$$\begin{bmatrix} 1 & 0 \\ 0 & 1 \end{bmatrix} \begin{bmatrix} X \\ Y \end{bmatrix} = \begin{bmatrix} 14.0 \\ 12.5 \end{bmatrix}$$

So, x=14 and y=12.5.

The point of this illustration is not to teach matrices, but to illustrate that they are amenable to sets of logical operations that are easily coded into systematic logical structures. Further, it is well known that determination of n variables requires at least n simultaneous equations, and often more when null results are found for variables within the equations.

Figure 6:
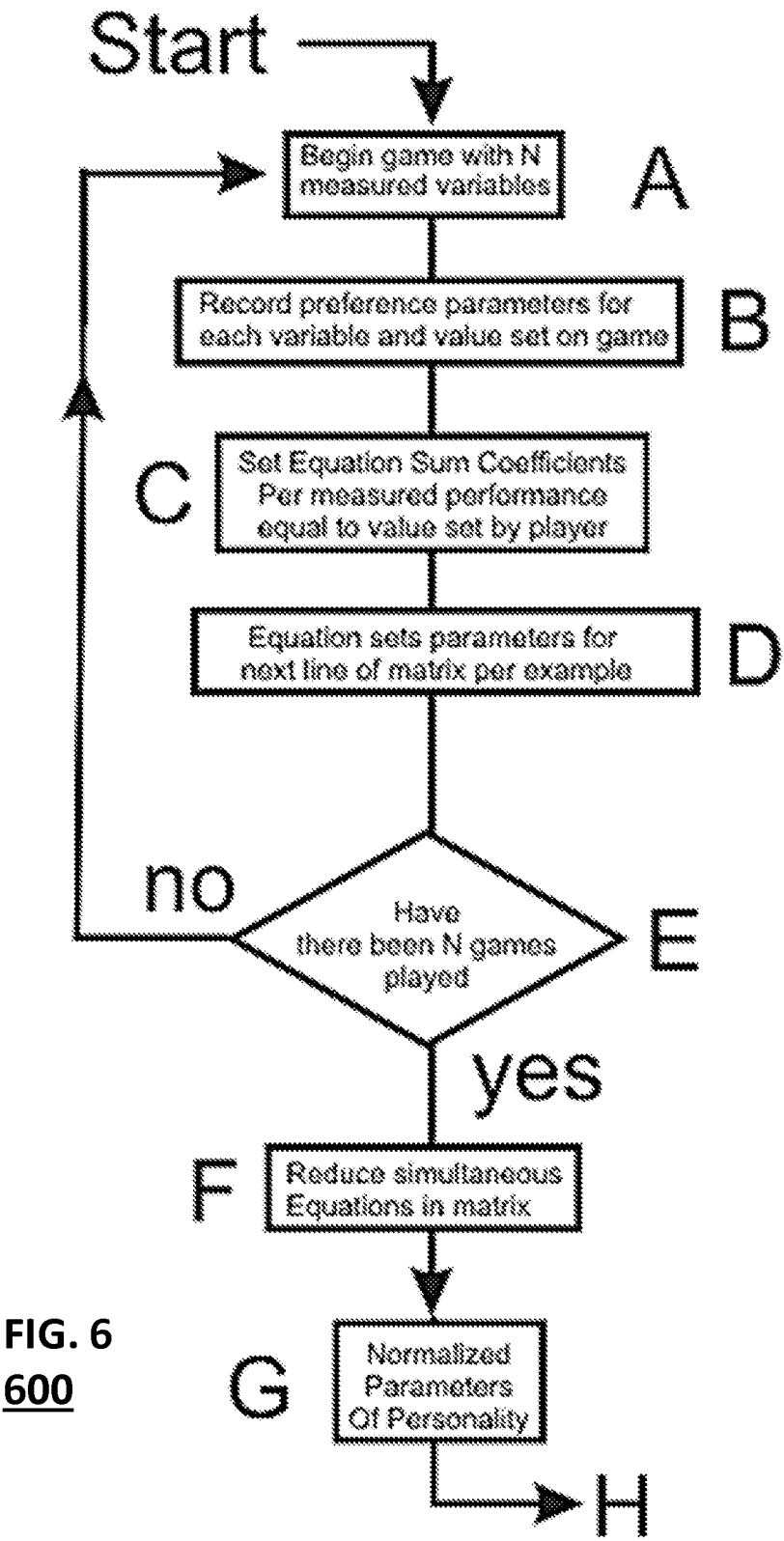
FIG. 6 shows an exemplary method for analysis of user attributes in a gaming environment.

Now referring to FIG. 6, there is shown an exemplary process of developing an N×N matrix for the simplistic game environment: The game is begun (A) with measurable variables defined, such as aggression, responsiveness, intuitiveness, strategy.

The start time, play investment (e.g. cost to play per minute), number of times player has chosen particular game, and other initially measurable variables noted (B). These will become the constant coefficients (C) in the equations for that particular game.

For each pass of game play, the measured variables are added until N variables are tested (D). The game is either altered, or modified if it does not test all the desired parameters. It may be that aggression, responsiveness, intuitiveness, strategy (for example) are not tested in each game. Indeed, variations in each game can be defined to enhance a particular attribute and will typically produce dissimilar equations and coefficients each time.

The process is repeated (E) until N simultaneous equations are developed and then reduced in matrix format (F) yielding N parameters (G) of the desired traits (H).

In gaming, traits that might be sought and discerned could be as numerous as the following partial list of example traits:

TABLE 1

Exemplary Traits

| Analog Scalable as a Trait—Positive | Analog Scalable as aTrait—Negative | FIG. 6 |
|---|---|---|
| Scalable Attitude Examples | | PACDNA |
| accepts authority, loyal, devoted | rebellious | +3 |
| accepts what's given affectionate | ignores, rejects what's given distant, cold, aloof | +2 |
| aspiring, ambitious, motivated | self-satisfied, unmotivated | +6 |
| candid | closed, guarded, secretive | -2 |
| caring | uncaring, unfeeling, callous | +7 |
| change; accepts, embraces- | rejects change | +3 |
| cheerful | cheerless, gloomy, sour, grumpy | +9 |
| considerate, thoughtful | inconsiderate, thoughtless | +1 |
| cooperative | uncooperative, unhelpful, combative | 0 |
| courageous | cowering, fearful | +2 |
| courteous | rude, impolite | +5 |
| decisive | indecisive | +4 |
| devoted | uncommitted, uncaring, hostile | -1 |
| determined | indecisive, unsure | +6 |
| does what is necessary, right | does what is convenient | -1 |
| perseveres, endures | relents, gives up | +1 |
| enthusiastic | unenthusiastic, apathetic, indifferent | +4 |
| expansive | kept back, tight, constricting | -1 |
| faith in life | life can't be trusted | +5 |
| faith in oneself | lack of faith in self | +5 |
| faith in others | others can't be relied on | +1 |
| flexible | inflexible, rigid, unbending, stubborn | +1 |

Table 1 is by no limits all inclusive. Rather a list can be as long as language can define—however, those attributes of an individual's personality, preferences, skills, attitudes (and more) can be extracted by this process and codified into giant matrices far too complex for human manipulation, but easily reduced by machines in an eye-blink. Matrices are exemplary of many other data mining and reduction techniques. Multiple diverse approaches are envisioned.

In a similar fashion, voids and strengths in aptitudes can be measured and remediation directed to enhance abilities. For example, students preparing for entrance exams may have strengths and voids in vocabulary detected from accumulated use of word processing or exposure through "kindle" or "nook" type reading tablets. After automated feedback, and appropriate selection, enhancement, adjustment, and even on demand development of appropriation applications, the voids would be filled by remediation. Interests and strengths could be enhanced and used as foundation for more learning.

Games might (perhaps surreptitiously) test vocabulary, reading comprehension, spatial relations, logic and creativity or (as above) there may be applications in a fantasy "game" environment to be selected, developed on demand, adjusted to test for strengths and voids in factual information and processing. Collectively the results are assembled into a matrix and reduced by an analogous feedback means.

Above, a number of techniques may be utilized simultaneously to validate the results in a 360 degree view of the individual. Games and analysis of the use of applications may be bounded environments, but they can be associated with specific decisions in real life experiences: for example: risk seeking, responsiveness and aggressiveness in investment decisions discerned from an online trading program history. Credit and purchase decisions viewed in the context of current wealth might yield similar results. Educational course selection, commitment, investment, results would be another set of salient factors. Online viewing habits, as recorded by a browser or ISP might yield additional insights.

Participation in a focus group, employee group task dynamic situation, or even a jury might not only yield a group defined goal, it can also yield traits of assertiveness, leadership, competitiveness, maturity and the like. These parameters and the coefficients associated with reward can all be codified by observation of the individual within the group.

A questionnaire might reveal self-perception of traits, or more subtle psychological evaluation, such as, word association testing (Myers-Briggs) would yield less subjective results. A person's health history and lifestyle decisions might also give measurable parameters of risk, aggression, impulsiveness, and the like. Indeed, eventually DNA testing may yield definable parameters for a wide range of personality and aptitude attributes.

Figure 7A:
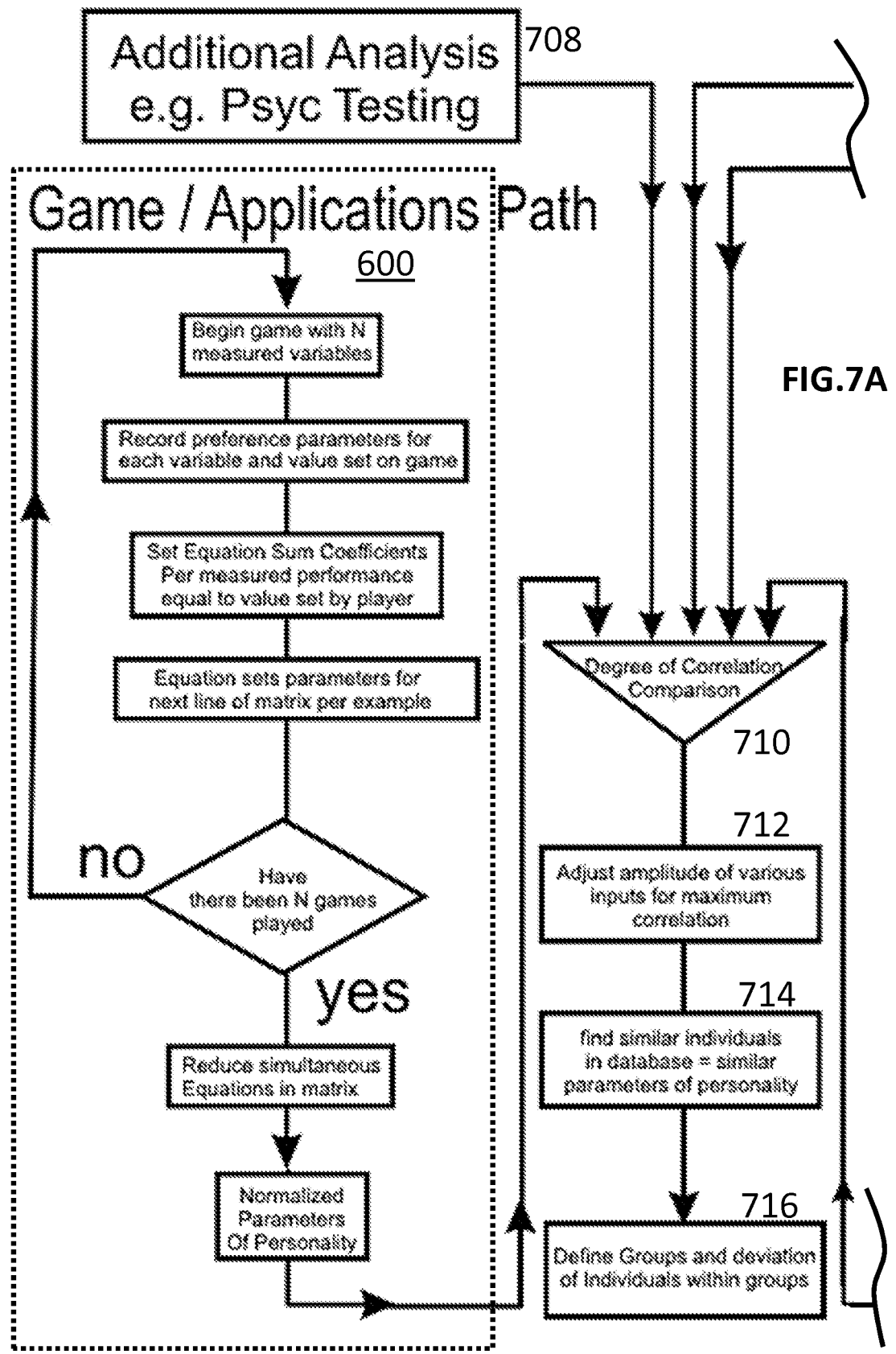
FIGS. 7A-7B shows an exemplary method for analysis of user attributes across multiple environments.
Figure 7B:
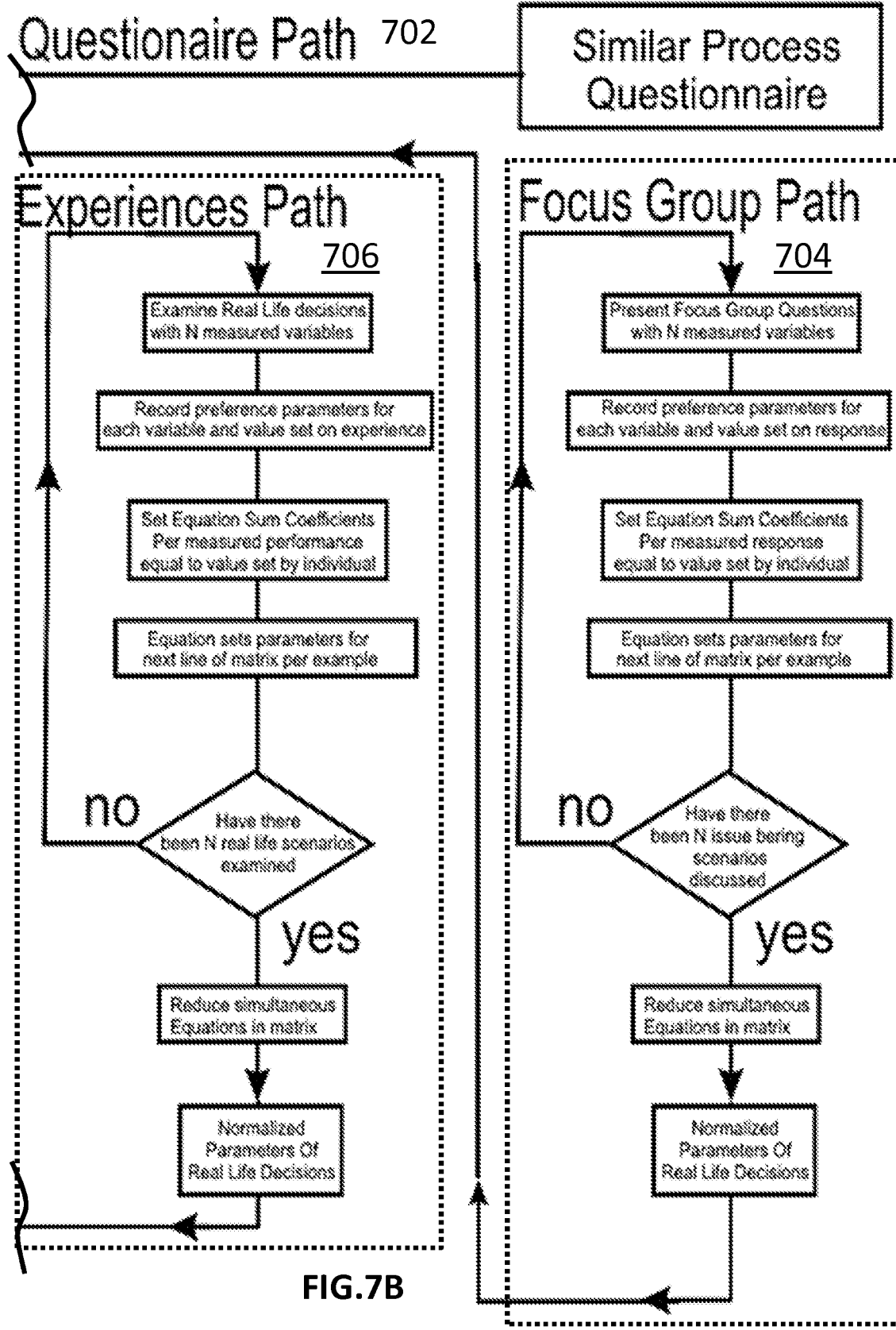

All of these can be integrated into a heuristic system, as shown in FIGS. 7A and 7B, where through experience, the system can weight various means of collecting data into a definable set of matrices that can classify an individual. As shown in FIGS. 7A and 7B, the system can involve collection information via various paths. A first path can be the game/applications path 600, as discussed above with respect to FIG. 6. A second path can be a questionnaire path 702, as discussed above. A third path can be a focus group path 704, as discussed above. This path can be implemented similarly to path 600 of FIG. 6, albeit adjusted for focus group questions instead of measuring game interactions. A fourth path can be an experiences path 706. A final path can be other analyses 708, such as psychological testing.

An experiences path 706 might be mined from behavior with credit, performance and completion of academic endeavor, military records, and other publically obtainable criminal, or civil, records. Other analysis might be recorded psychological testing (Myers Briggs, for example) that indicate personality type (impulsiveness, intuitiveness, demonstrative, assertive, socialization and compliance attributes. Indeed, the Myers-Briggs word association and preferences might be surreptitiously embedded into a word processor where choice of synonyms is over time recorded. Indeed, over time the word processor could suggest specific words from a personality test to see directly which words the user prefers. Or the user may be induced by reward, or condition of acceptance for credit, academic admission, employment, and the results integrated into the profile.

The results of each of the paths can then be analyzed to obtain a degree of correlation comparisons (710) and weighted (712) to obtain a maximum correlation possible. Thereafter, based on the correlation, similar individuals can be identified (714) and groups can be defined (716). Additionally, the groups can be characterized to record the deviations within the groups.

Figure 8:
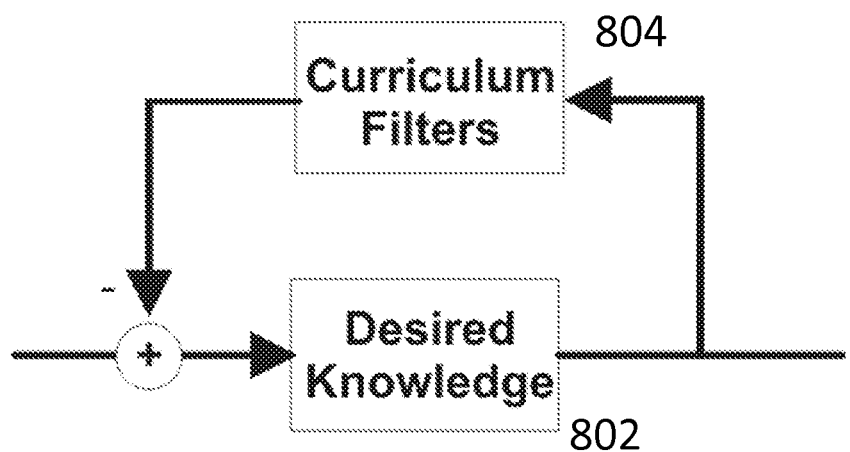
FIG. 8 schematically shows an exemplary configuration for feedback and adaption in accordance with the present technology.

In other words, Given that such data can be augmented by analysis of the use of common applications, such as a word processor, where intelligence and educational level can be induced from vocabulary and complexity of prose, more indirect importation of data can arrive at evaluated skills and aptitudes. This concept is graphically illustrated in FIG. 8. As shown in FIG. 8, to develop skills or knowledge, the desired or required knowledge is first determined (802), e.g., via one or methods described above. The desired or required knowledge then determines what curriculum is suitable by filtering from all possibilities (804). This process then repeats until the required or desired knowledge is obtained.

Further, by recording which words an individual may choose or reject to form a sentence or complete an idea, or most relevantly describe oneself, the components of a Myers Briggs test of personality can be collected and mined. The words rejected, or replaced, may be as meaningful as those selected. Indeed the word processor may "seed", or clandestinely offer key words of the Myers-Briggs test as replacement alternatives to exercise a defined choice purposely. Given enough opportunities, over enough time, a very accurate description of an individual's personality can be surreptitiously obtained.

Figure 9:
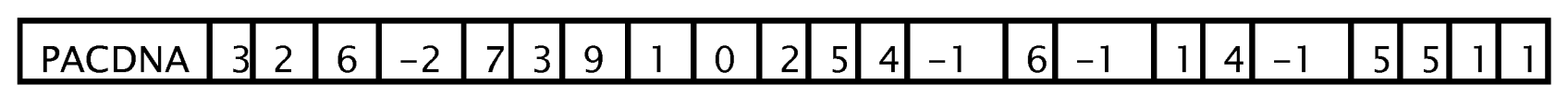

A public record of an individual's decisions as to purchases, loans, risks, criminal behavior, associations, scholastic achievement, personal health management, and the like can be included. The net is, all of these results come either as a result of the stimulus and controls impressed on the individuals performance and the results obtained, per the above examples. While the matrix, or set of simultaneous equations may be beyond the reach of a human mind to integrate, the machine can reduce the matrix to a set of normalized solutions that become an individual's DNA of personality (PACDNA) as in the right hand column of FIG. 6 above. The set of traits can be truncated to specific markers similar to DNA as well. Varying levels of markers may be included in varying levels of definition and priced accordingly to interest. The PACDNA can be thought of as a vector, potentially very long, that describes one dimension of an individual. There may be many dimensions of personality, achievement, health, time, etc. to define an n-dimensional matrix to classify multiple "profile" aspects of an individual. An example of such a profile is illustrated in FIG. 9.

The importance of feedback is to fill in the blanks in the matrices, or to achieve clarity and confirmation on specific desired markers. Depending on the decisions to be made, or the decisions to be induced by given stimuli, the comparisons to other individuals desired, the directions into which an individual may be trained, or behavior modified—then the selection of application programs (or games perhaps) can be varied and tuned for the desired refinement of the individuals signature. By comparison, feedback can verify that the personal attributes are consistent with experience.

Feedback may identify that new applications may need to be defined, to detect desired traits (parameters), to eliminate ineffective applications and replace them by more accurate ones. Entire activities as in games may be defined, and attributes of decisions in real life may be imported. The system would improve with time and with increased knowledge and experience with all individuals and for specific individuals as they become known. Once a common set of effective applications, and scoring within applications, is developed—it can be made consistent across a population for the purposes of comparison.

With this feedback, the process can become heuristic. Due to poor design or lack of appropriate applications, the signature of an individual may be fuzzy at first, but will gain accuracy and clarity over time with feedback tuning and improvement of applications. In the applications to healthcare, the response to stimuli may include response to lifestyle guidance, response to medication or treatment, response to a given therapist of other care provider. Indeed the process can be reversed to evaluate the provider, given the predicted responses expected.

Much information can be gained from recording and analyzing the performance of individuals in the more simplistic, virtual and fantasy situations, indeed without the individual's awareness. Games may be designed to select and recruit specific personality traits—or to rapidly compare individuals to one another, or to past successful or unsuccessful applications of similar personality signatures. The information may be subtly revealed from within a game or other application and clandestinely be more intimate and accurate, because it is candid.

One can envision online games with feedback that are constantly tuning the application to discover valuable information or select (deselect) individuals from opportunities, risks, responsibilities, or experiences to which they are not suited. The very best virtual opponents may be defined in simulation exercises for training. Weaknesses might even be remediated by progression through ESN stages.

A user might dynamically tailor a game to have the personally desired levels of aggressiveness, creativity, romance, by simple key depressions indicating acceptance or rejection of a given episode in the fantasy environment. Some users may reinforce highly active x-rated scenarios with car chases, shoot-em-up scenes and pan quiet segments with artistic scenery or poetic narrative. Others would select science fiction with creative plot twists and deep messages. Still others might seek romantic tearjerkers with an overtone of emotional justice. With feedback and tuning of the application to the individuals preferences, detailed information beyond simply filling out a form or questionnaire can be accurately derived. What a person might voluntarily tailor for themselves could be more telling than any other mode of interactive interrogation. The personality and aptitude model (s) derived from the simplistic, but potentially consistent environment of games, could be compared individually or as large (de-identified?) groups of data for verification against the individual or social actions of a group. For example, a large number of potential voters is classified according to a prototype model and then compared to actual individual (exit polling) voting results. Test arguments may be displayed against a group of voters with specific sets of attitudes and sampled for effectiveness.

Very much the same set of exercises could be established for testing the effects of branding, advertising, marketing strategies, packaging, and options with products. Rather than focus groups or polling factions according ethnic, regional, economic, and other factors—the attributes of personality can become the basis for defining the marketability of a product. Questions like: "Does a proposed brand name for a product appeal to individuals with a romantic bend with a penchant for cleanliness and social awareness". Does a given bumper and grille design appeal to the aggressive, power centric, achievement oriented demographic that presently buys a car. Should a movie end a particular way, in order to appeal to the logical, caring, decisive target audience—in view of the reception of the same group to a similar movie one month before. Indeed, with multiple endings, the outcome of a movie (fantasy) can be adjusted on the fly to a specific audience that has recently been analyzed by a game attractive to a similar game profile. Rather than recruit a set of statistically valid focus groups, the results for a population could be estimated inexpensively and quickly.

Once the personality model is developed, the success of a given stimuli may be somewhat predicted. Given parametric "needs" of a situation, such as aggressiveness, intuition, patience, trust, etc. —the match to individual's scores in these areas will indicate the potential reaction of the individual in a real life situation. When a sequence of Episodic Social Networks (ESNs) is defined, the inducement to migrate from one network (affinity) group to another can be based on such a model. It could work for individuals, groups, even nations.

Figure 10:
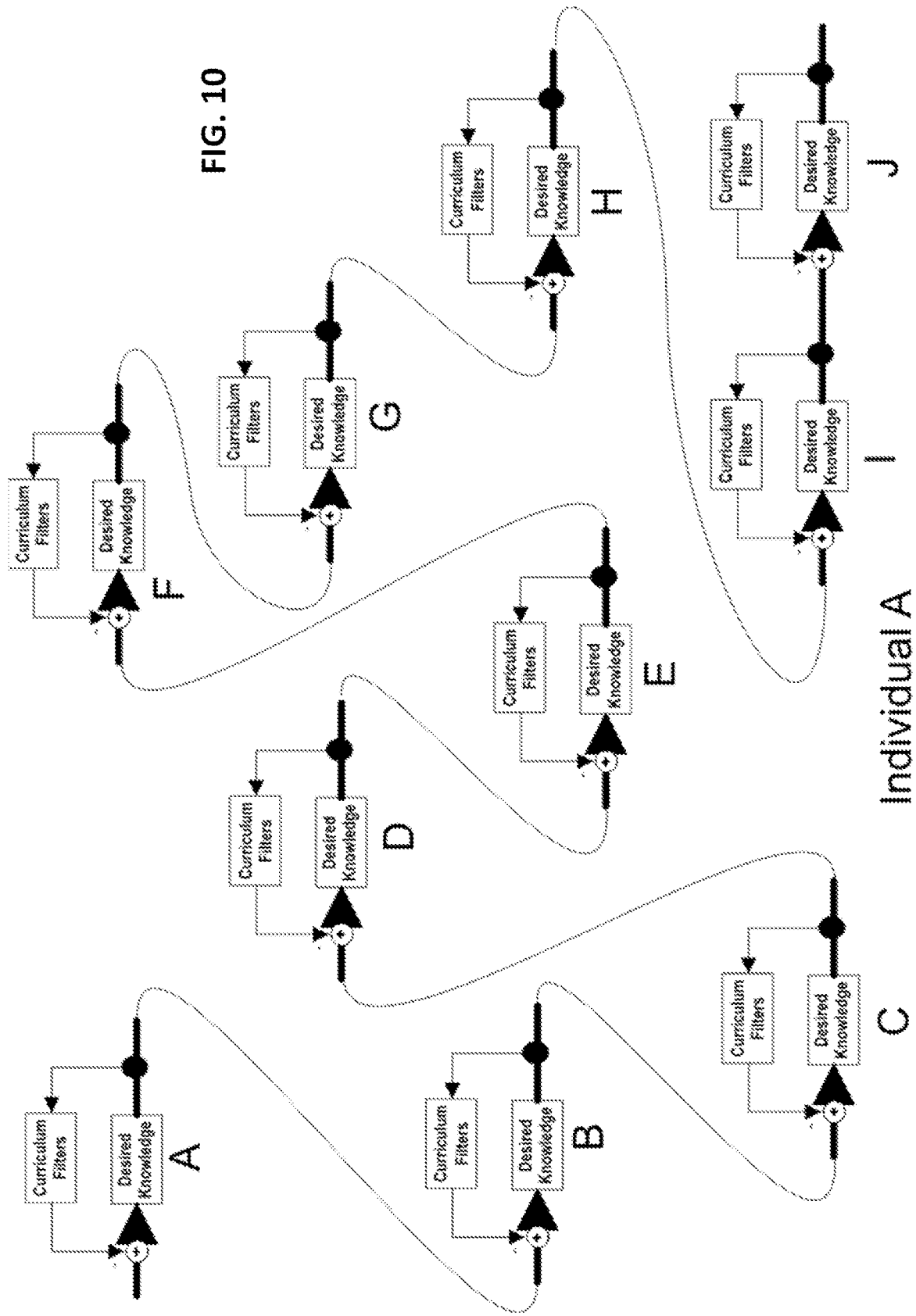
FIG. 10 shows an exemplary traversal of episodic social networks for a first user in accordance with the present technology.

As in the definition of ESNs, the personality and aptitude characteristics can be used to induce or predict the right motivation to make appropriate decisions when bridging between ESNs. And entire curriculum might be designed around the personality and aptitudes of an individual for optimal guidance and effectiveness in learning. In the following example, individual A might be defined as a typical rote learner, with each topic mastered in a logical sequence. An exemplary standard progression through steps or blocks A-J for individual A is illustrated in FIG. 10.

But based on the individual aptitude and personality attributes of another individual—the rote/logical approach may be inefficient or even detrimental. Here, each step, expressed as an ESN is understood, induced and scheduled for a specific set of PACDNA results. A different curriculum can then be custom designed to the individual (potentially delivered by automated and on line means). For, example, a personality test might show a high degree of intuitiveness, where an individual may not require all the steps in developing a concept and would indeed become less interested in a rote approach. In a math exam, one intuitive type of individual might be asked to prove that a square is the figure with the largest area that can be inscribed within a circle—but not use calculus. Such lateral thinking individuals are capable of "filling in the blanks" and indeed enjoy learning exercises that require creativity might benefit from a more challenging academic approach that a less intuitive person might reject. Rather than a step by step approach, they might be guided into individual study that is typical of "gifted" education. By example: rather than having an anatomy student draw a spleen, ask "what would be the effect if an individual had two spleens or two livers, or two pancreas?".

Figure 11:
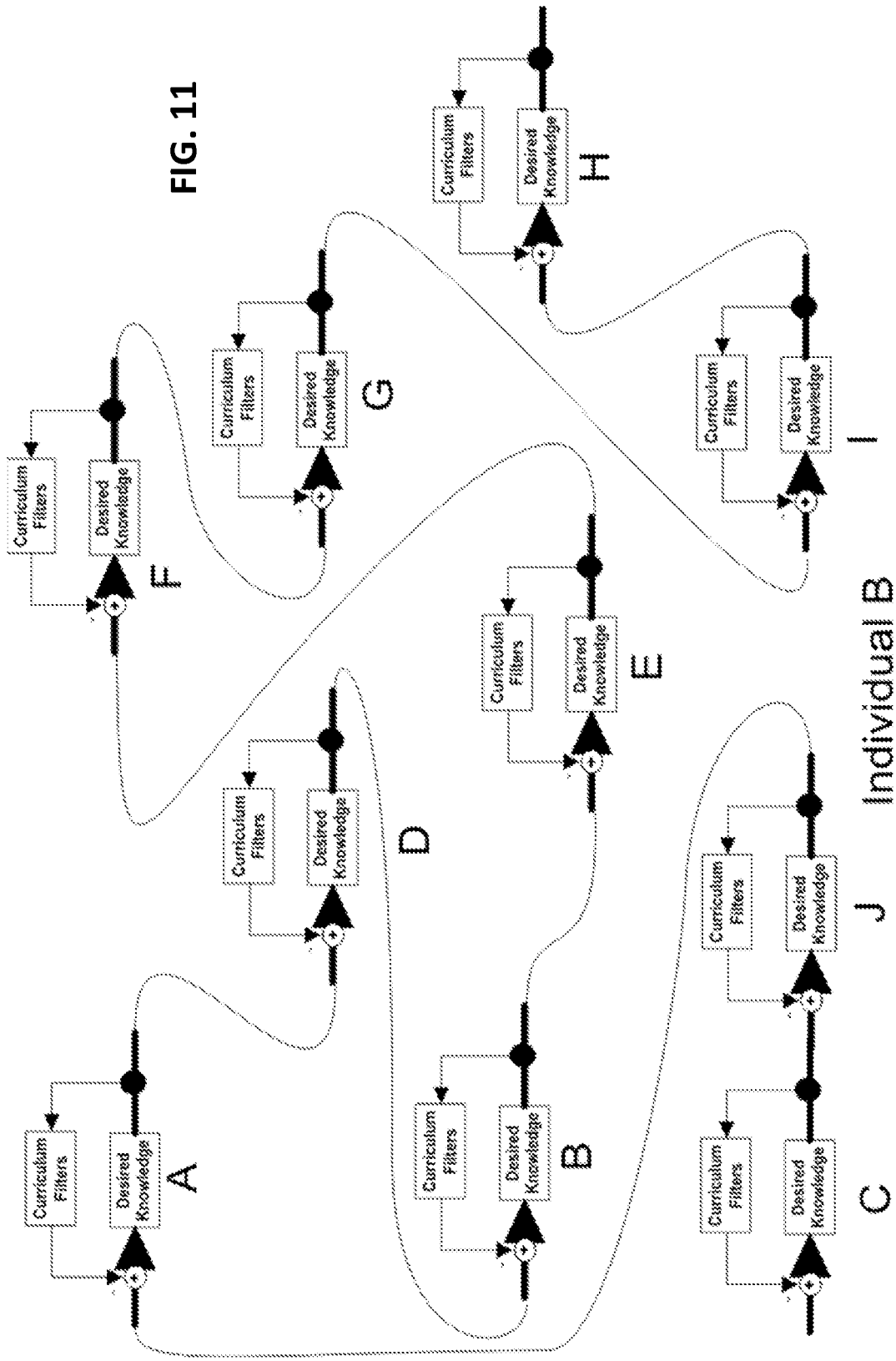
FIG. 11 shows an exemplary traversal of the episodic social networks in FIG. 10 for a second user in accordance with the present technology.

Uniquely, individual B may be highly intuitive, or have learning or language disabilities that might allow skipping some material or require remediation—based on the feedback adjustments made and the optimal path as determined by aptitudes, attitudes, personality and interests. An exemplary customized progression through steps or block A-J for individual B is illustrated in FIG. 11. In some embodiments, this path can be pre-defined for particular personality types, persons with particular capabilities or disabilities. However, in other embodiments, the path can be generated dynamically from the PACDNA results.

Indeed, one can also envision an "expert system" or artificial intelligence that is developed to mimic a given personality attribute signature, provide aspects of personality, or tune its decision process based on the experience of humans. One might even more accurately match individuals on computer dating sites, to given corporate environments, given cultural surroundings, even to (political) philosophies to which individuals will be attracted or repelled.

Indeed, if a complete enough history of decisions (real or fantasy-game) is accumulated, such an expert system might be defined to live on after the individual. Perhaps a question like: "how would our founding fathers react to a given proposed law" could even be answered. Or, when questions arise, how would a parent want their will, foundations and trusts to be executed. If these models run fast enough, the real-time "personality" of robotic systems may be defined. A telephone information system may "know" to approach a given individual with a synthesized personality that is non-abrasive and attractive to that individual.

An online sales outlet would not say: "other people who have bought what you have, also bought X". Rather, (much like an attentive husband might know about a wife's preferences and tastes after decades of marriage) it would "know" what dress or car, or home one would like, even if it is an apparent surprise. Think of what department stores, car dealers and real estate agents could do with such information!

In some embodiments, one might sign on to websites and online applications and the machine would know how you would best respond to the organization, colors and presentation of the site. Education could be tuned to the attributes of an individual. Not only is someone an auditory learner, or a visually oriented mentality, but the sequence of ideas and presentation can be defined as a sequence of ESN experiences. Indeed the entire curriculum might be tuned to what an individual most needs, or is capable of, or can benefit society through, or enhance an organization from.

In other embodiments, robotic decisions, such as the battlefield performance of a drone aircraft can be infused with the personality and decision analysis of an ace pilot. Individuals, potentially harmful to the nation may be screened, perhaps by a series of games, before entry. Indeed, much as some immigrants were once quarantined for the elimination of disease, other individuals may be held for personality and character screening. The system could be so complex, and require such instant responses that no level of human training could spoof it. One of the vexing problems of law enforcement and psychiatry is that individuals often exhibit potentially destructive behaviors without prior warning. This means of evaluation might provide some early detection and enable potential intervention where required. The destructive behaviors might be modified through a sequence of ESN defined "fantasy experiences", such that some hardened individuals have a chance at rehabilitation and others, who are not amenable to change, are simply isolated from society.

In another embodiment, the present technology can be utilized in the field of diplomacy. That is, the relations between nations and organizations and their leaders could be classified by this method. Potential strategies modeled and decisions made between the effectiveness of inducements and punishments. Do we offer foreign aid, or economically isolate a group? Complex questions, such as:

When we wage war, what is the right amount of force to encourage surrender as opposed to inducing revenge? A diplomatic or military encounter might be modeled as a sequence of ESNs, with each stage tested against a model of the opponent's synthesized inclinations, policies, ideologies and weaknesses.

When we encounter cultures, essentially unlike our own, how can common ground be found? In negotiation, what is a win-win outcome for a given individual or national personality?

In some embodiments, in addition to or as an alternative to direct user interaction, mobile, wearable, or embedded devices can be used to provide input to the vectors. For example, parameters of temperature, blood pressure, $CO_2$ and oxygen saturation, the curve of blood flow from a pulse oximeter, or the curve of respiration by capnograph can be inputs for health or wellness measures, or indicators of the involvement and attitude of the individual during a game or other application.

Figure 12:
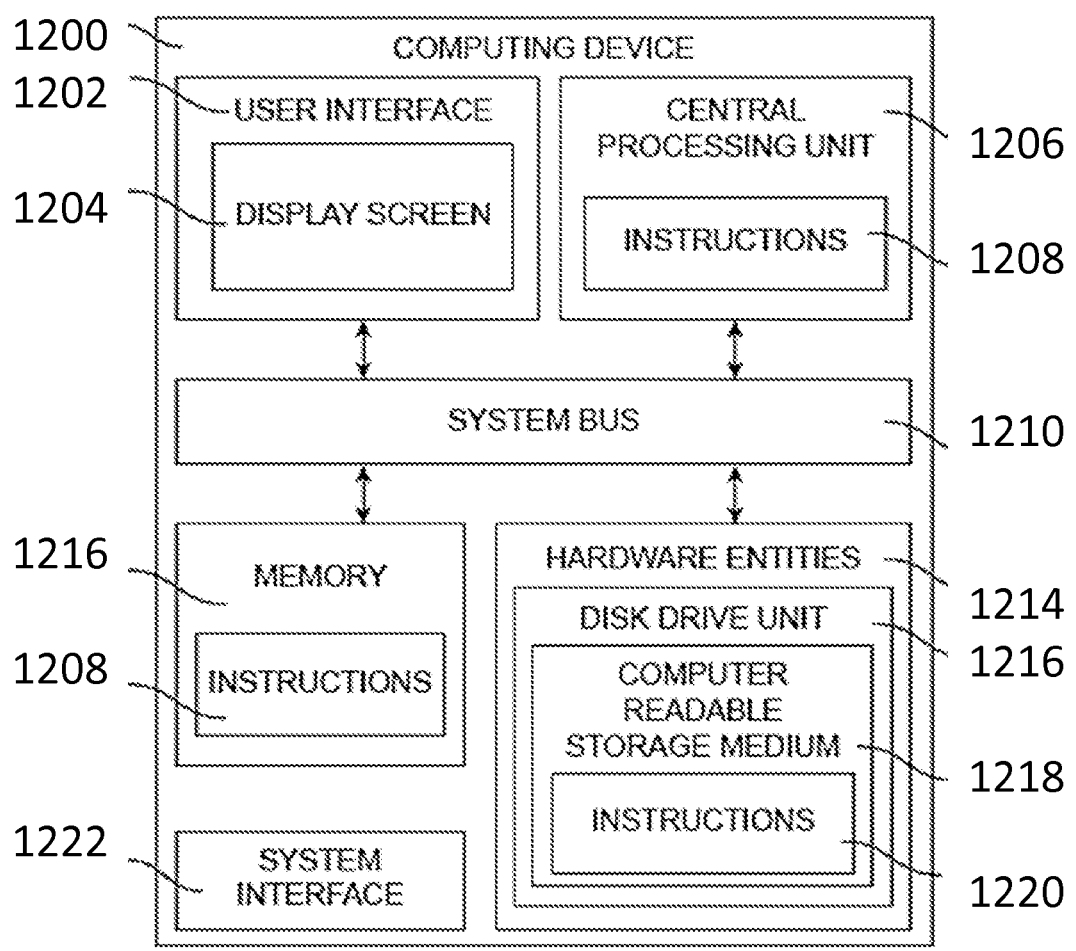
FIG. 12 shows an exemplary configuration for a computing device for carrying out the various embodiments of the present technology.

Referring now to FIG. 12, there is provided a detailed block diagram of a computing device 1200 which can be implemented to perform the various embodiments of the present technology. Although various components are shown in FIG. 12, the computing device 1200 may include more or less components than those shown in FIG. 12. However, the components shown are sufficient to disclose an illustrative embodiment of the present technology. The hardware architecture of FIG. 12 represents only one embodiment of a representative computing device.

As shown in FIG. 12, computing device 1200 includes a system interface 1222, a Central Processing Unit (CPU) 1206, a system bus 1210, a memory 1216 connected to and accessible by other portions of computing device 1200 through system bus 1210, and hardware entities 1214 connected to system bus 1210. At least some of the hardware entities 1214 perform actions involving access to and use of memory 1216, which may be any type of volatile or non-volatile memory devices. Such memory can include, for example, magnetic, optical, or semiconductor based memory devices. However the various embodiments of the present technology are not limited in this regard.

In some embodiments, computing system can include a user interface 1202. User interface 1202 can be an internal or external component of computing device 1200. User interface 1202 can include input devices, output devices, and software routines configured to allow a user to interact with and control software applications installed on the computing device 1200. Such input and output devices include, but are not limited to, a display screen 1204, a speaker (not shown), a keypad (not shown), a directional pad (not shown), a directional knob (not shown), and a microphone (not shown). As such, user interface 1202 can facilitate a user-software interaction for launching software development applications and other types of applications installed on the computing device 1200.

System interface 1222 allows the computing device 1200 to communicate directly or indirectly with the other devices, such as an external user interface or other computing devices. Additionally, computing device can include hardware entities 1214, such as microprocessors, application specific integrated circuits (ASICs), and other hardware. As shown in FIG. 12, the hardware entities 1214 can also include a removable memory unit 1216 comprising a computer-readable storage medium 1218 on which is stored one or more sets of instructions 1220 (e.g., software code) configured to implement one or more of the methodologies, procedures, or functions described herein. The instructions 1220 can also reside, completely or at least partially, within the memory 1216 and/or within the CPU 1206 during execution thereof by the computing device 1200. The memory 1216 and the CPU 1206 also can constitute machine-readable media.

While the computer-readable storage medium 1218 is shown in an exemplary embodiment to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable storage medium" shall accordingly be taken to include, but not be limited to solid-state memories (such as a memory card or other package that houses one or more read-only (non-volatile) memories, random access memories, or other re-writable (volatile) memories), magneto-optical or optical medium (such as a disk or tape). Accordingly, the disclosure is considered to include any one or more of a computer-readable storage medium or a distribution medium, as listed herein and to include recognized equivalents and successor media, in which the software implementations herein are stored.

System interface 1222 can include a network interface unit configured to facilitate communications over a communications network with one or more external devices. Accordingly, a network interface unit can be provided for use with various communication protocols including the IP protocol. Network interface unit can include, but is not limited to, a transceiver, a transceiving device, and a network interface card (NIC).

While various embodiments of the present technology have been described above, it should be understood that they have been presented by way of example only, and not limitation. Numerous changes to the disclosed embodiments can be made in accordance with the disclosure herein without departing from the spirit or scope of the present technology. Thus, the breadth and scope of the present technology should not be limited by any of the above described embodiments. Rather, the scope of the present technology should be defined in accordance with the following claims and their equivalents.

Although the present technology has been illustrated and described with respect to one or more implementations, equivalent alterations and modifications will occur to others skilled in the art upon the reading and understanding of this specification and the annexed drawings. In addition, while a particular feature of the present technology may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the present technology. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this present technology belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A computer-implemented method, comprising:
    recording first interactions of a user with one or more computer-implemented applications from a plurality of available computer-implemented applications, the one or more computer-implemented applications being executed on a terminal device;
    determining one or more parameter values for a first portion of a plurality of user attributes based on the recorded first interactions, the plurality of user attributes being indicative of preferences of the user for interacting with any of the plurality of available computer-implemented applications;
    storing the determined one or more parameter values for the first portion of the plurality of user attributes in a matrix;
    determining that one or more parameter values for a second portion of the plurality of user attributes are omitted from the matrix;
    selecting an additional computer-implemented application from the plurality of available computer-implemented applications, the additional computer-implemented application being associated with at least one of the omitted one or more parameter values for the second portion of the plurality of user attributes;
    sending a request to the terminal device to execute the selected additional computer-implemented application;
    recording second interactions of the user with the additional computer-implemented application;
    determining one or more parameter values for the second portion of the plurality of user attributes based on the recorded second interactions;
    storing the determined one or more parameter values for the second portion of the plurality of user attributes in the matrix; and
    responsive to one of the plurality of available computer-implemented applications being initiated on the terminal device after the storing of the determined one or more parameters values for the second portion, automatically reconfiguring, based at least in part on the matrix, a user interface or an interaction mode of the initiated one of the plurality of available computer-implemented applications.

2. The method of claim 1, wherein the determining the one or more parameter values for the first portion of the plurality of user attributes includes:
    assembling a plurality of equations corresponding to the plurality of available computer-implemented applications, each of the plurality of equations defining a relationship between an output of one of the plurality of available computer-implemented applications and at least one of the parameter values for the first portion of the plurality of user attributes; and solving the plurality of equations to compute the one or more parameter values for the first portion of the plurality of user attributes.

3. The method of claim 1, wherein additional computer-implemented application is configured to provide an output that can be translated into a new parameter value for each of the at least one of the omitted one or more parameter values.

4. The method of claim 1, wherein the plurality of user attributes includes an aggression attribute, a creativity attribute, a responsiveness attribute, an intuitiveness attribute, a strategy attribute, or any combination thereof.

5. The method of claim 1, further comprising integrating the determined one or more parameter values for the first portion of the plurality of user attributes into a heuristic system.

6. The method of claim 1, wherein the additional computer-implemented application is different from the one or more computer-implemented applications from which the first interactions of the user were recorded.

7. The method of claim 1, wherein the one of the plurality of available computer-implemented applications initiated on the terminal device after the storing of the determined one or more parameters values for the second portion is different from the additional computer-implemented application.

8. The method of claim 1, wherein the plurality of available computer-implemented applications includes one or more gaming applications.

9. A system, comprising:
at least one processor; and
a computer readable medium having stored thereon a plurality of code sections for causing the at least one processor to:
record first interactions of a user with one or more computer-implemented applications from a plurality of available computer-implemented applications, the one or more computer-implemented applications being executed on a terminal device;
determine one or more parameter values for a first portion of a plurality of user attributes based on the recorded first interactions, the plurality of user attributes being indicative of preferences of the user for interacting with any of the plurality of available computer-implemented applications;
store the determined one or more parameter values for the first portion of the plurality of user attributes in a matrix;
determine that one or more parameter values for a second portion of the plurality of user attributes are omitted from the matrix;
select an additional computer-implemented application from the plurality of available computer-implemented applications, the additional computer-implemented application being associated with at least one of the omitted one or more parameter values for the second portion of the plurality of user attributes;
send a request to the terminal device to execute the selected additional computer-implemented application;
record second interactions of the user with the additional computer-implemented application;
determine one or more parameter values for the second portion of the plurality of user attributes based on the recorded second interactions;
store the determined one or more parameter values for the second portion of the plurality of user attributes in the matrix; and responsive to one of the plurality of available computer-implemented applications being initiated on the terminal device after the storing of the determined one or more parameters values for the second portion, automatically reconfigure, based at least in part on the matrix, a user interface or an interaction mode of the initiated one of the plurality of available computer-implemented applications.

10. The system of claim 9, wherein the determining the one or more parameter values for the first portion of the plurality of user attributes includes:
assembling a plurality of equations corresponding to the plurality of available computer-implemented applications, each of the plurality of equations defining a relationship between an output of one of the plurality of available computer-implemented applications and at least one of the parameter values for the first portion of the plurality of user attributes; and
solving the plurality of equations to compute the one or more parameter values for the first portion of the plurality of user attributes.

11. The system of claim 9, wherein the additional computer-implemented application is configured to provide an output that can be translated into a new parameter value for each of the at least one of the omitted one or more parameter values.

12. The system of claim 9, wherein the plurality of user attributes includes an aggression attribute, a creativity attribute, a responsiveness attribute, an intuitiveness attribute, a strategy attribute, or any combination thereof.

13. The system of claim 9, wherein the at least one processor is further caused to integrate the determined one or more parameter values for the first portion of the plurality of user attributes into a heuristic system.

14. The system of claim 9, wherein the additional computer-implemented application is different from the one or more computer-implemented applications from which the first interactions of the user were recorded.

15. A non-transitory computer-readable medium having stored thereon instructions which, when executed by a computer, cause the computer to perform operations comprising:
recording first interactions of a user with one or more computer-implemented applications from a plurality of available computer-implemented applications, the one or more computer-implemented applications being executed on a terminal device;
determining one or more parameter values for a first portion of a plurality of user attributes based on the recorded first interactions, the plurality of user attributes being indicative of preferences of the user for interacting with any of the plurality of available computer-implemented applications;
storing the determined one or more parameter values for the first portion of the plurality of user attributes in a matrix;
determining that one or more parameter values for a second portion of the plurality of user attributes are omitted from the matrix;
selecting an additional computer-implemented application from the plurality of available computer-implemented applications, the additional computer-implemented application being associated with at least one of the omitted one or more parameter values for the second portion of the plurality of user attributes;
sending a request to the terminal device to execute the additional computer-implemented application;

recording second interactions of the user with the additional computer-implemented application;

determining one or more parameter values for the second portion of the plurality of user attributes based on the recorded second interactions;

storing the determined one or more parameter values for the second portion of the plurality of user attributes in the matrix; and responsive to one of the plurality of available computer-implemented applications being initiated on the terminal device after the storing of the determined one or more parameters values for the second portion, automatically reconfiguring, based at least in part on the matrix, a user interface or an interaction mode of the initiated one of the plurality of available computer-implemented applications.

16. The non-transitory computer-readable medium of claim 15, wherein the determining the one or more parameter values for the first portion of the plurality of user attributes includes:

assembling a plurality of equations corresponding to the plurality of available computer-implemented applications, each of the plurality of equations defining a relationship between an output of one of the plurality of available computer-implemented applications and at least one of the parameter values for the first portion of the plurality of user attributes; and solving the plurality of equations to compute the one or more parameter values for the first portion of the plurality of user attributes.

17. The non-transitory computer-readable medium of claim 15, wherein the additional computer-implemented application is configured to provide an output that can be translated into a new parameter value for each of the at least one of the omitted one or more parameter values.

18. The non-transitory computer-readable medium of claim 15, wherein the plurality of user attributes includes an aggression attribute, a creativity attribute, a responsiveness attribute, an intuitiveness attribute, a strategy attribute, or any combination thereof.

19. The non-transitory computer-readable medium of claim 15, wherein the operations further include integrating the determined one or more parameter values for the first portion of the plurality of user attributes into a heuristic system.

20. The non-transitory computer-readable medium of claim 15, wherein the additional computer-implemented application is different from the one or more computer-implemented applications from which the first interactions of the user were recorded.

* * * * *

UNITED STATES PATENT AND TRADEMARK OFFICE
CERTIFICATE OF CORRECTION

| | |
|---|---|
| PATENT NO. | : 10,679,185 B2 |
| APPLICATION NO. | : 14/467539 |
| DATED | : June 9, 2020 |
| INVENTOR(S) | : Guillama et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 734 days.

Signed and Sealed this
Seventh Day of February, 2023

Katherine Kelly Vidal
*Director of the United States Patent and Trademark Office*